United States Patent [19]

Böer et al.

[11] Patent Number: 5,053,663
[45] Date of Patent: Oct. 1, 1991

[54] DEVICE FOR FIXING AN AIR-GAP WINDING OF A DYNAMO-ELECTRIC MACHINE

[75] Inventors: Joachim Böer; Fritz Sommer, both of Mülheim/Ruhr, Fed. Rep. of Germany

[73] Assignee: Siemens Aktiengesellschaft, Munich, Fed. Rep. of Germany

[21] Appl. No.: 272,981

[22] PCT Filed: Apr. 9, 1987

[86] PCT No.: PCT/DE87/00162
§ 371 Date: Oct. 7, 1988
§ 102(e) Date: Oct. 7, 1988

[87] PCT Pub. No.: WO87/06400
PCT Pub. Date: Oct. 22, 1987

[30] Foreign Application Priority Data

Apr. 16, 1986 [DE] Fed. Rep. of Germany ....... 3612819

[51] Int. Cl.$^5$ ............................................. H02K 5/00
[52] U.S. Cl. ......................................... 310/91; 310/42; 310/179; 310/214; 310/259
[58] Field of Search ............... 310/214, 179, 180, 192, 310/42, 206, 43, 45, 91, 101, 254, 255, 257, 258, 259, 194

[56] References Cited

U.S. PATENT DOCUMENTS

| | | |
|---|---|---|
| 3,157,939 | 11/1964 | Balke . |
| 4,137,471 | 1/1979 | Sasto ................................ 310/45 |
| 4,228,375 | 10/1980 | Beermann ........................ 310/179 |
| 4,292,558 | 9/1981 | Flick ................................ 310/179 |
| 4,356,419 | 10/1982 | Boer ................................. 310/217 |
| 4,431,932 | 2/1984 | Nathenson ...................... 310/206 |

FOREIGN PATENT DOCUMENTS

| | | |
|---|---|---|
| 2165678 | 7/1973 | Fed. Rep. of Germany . |
| 2924863 | 1/1981 | Fed. Rep. of Germany . |
| 2331184 | 6/1977 | France . |
| 2401539 | 3/1979 | France . |
| 2533376 | 3/1984 | France . |
| 2055253 | 2/1981 | United Kingdom . |

Primary Examiner—R. Skudy
Attorney, Agent, or Firm—Herbert L. Lerner; Laurence A. Greenberg

[57] ABSTRACT

An electric machine includes a stator lamination packet having an inner periphery defining a stator bore, a laminted screening packet with an inner periphery and lamination segments formed of magnetic material, and a slot and tooth system disposed on and connected to the inner periphery of the screening packet, the slot and tooth system being at least partly formed of nonmagnetic material and having successive slot teeth defining bar receiving slots with a slot bottom, and an air-gap winding on the inner periphery of the stator lamination packet having winding bars with winding bar sides oriented toward the stator bore, the winding bars being inserted in the bar receiving slots with a radial protrusion beyond the slot teeth. A system for fixing the air-gap winding on the inner periphery of the stator lamination packet and a method for assembling and dismantling the system include a retaining device pressing the winding bar sides against the slot bottom, the retaining device having a multiplicty of elastic support rings being mutually aligned in axial direction of the electric machine and having outer peripheries, the support rings having at least one dividing seam formed therein, a turnbuckle inside the stator bore in the vicinity of the at least one dividing seam for varying the diameter and adjusting azimuthal prestressing of the support rings, and spring elements inserted between the outer peripheries of the support rings and the winding bar sides.

15 Claims, 8 Drawing Sheets

DEVICE FOR FIXING AN AIR-GAP WINDING OF A DYNAMO-ELECTRIC MACHINE

The invention relates to a system for fixing an air-gap winding on the inside circumference of the stator lamination packet of high-power dynamo-electric machines, in particular turbo-generators A) wherein the stator lamination packet that with its inside circumference defines the stator bore for the machine rotor revolving with an air gap is composed of the following:

A1) a laminated screening packet of approximately circular-annular cross section in the yoke region, the lamination segments of which comprise magnetic material, A2) and a slot and tooth system disposed on the inside circumference of the screening packet, which system, at least in the vicinity of the bore, comprises nonmagnetic material and at abutment points, which are distributed over the inside circumference of the screening packet, is rigidly connected to the screening packet, B) wherein the winding bars of the air-gap winding can be inserted, with a radial excess protrusion protruding beyond the slot teeth into the air gap, into the circumferential interstices serving as axially parallel bar receiving slots, which are each defined in the tangential direction by successive slot teeth, and are fixable in their introduced position by means of a retaining device resting with a large area of contact against the winding bar sides oriented toward the stator bore and pressing the winding bars against the slot bottom.

A system of this kind is known from German Patent 29 24 863. There, the individual slot segment bar groups are covered by pressure strips extending axially of the machine, and in the space between two pressure strips tangentially adjacent one another, radial clamping screws distributed over the length of the lamination packet are disposed in the vicinity of the slot teeth, these screws being screwed into anchorage points of the lamination packet. These screws for instance comprise axial bolts provided with radial threaded bores and insulated on the outside, which are inserted into corresponding axial bores of the lamination packet. On their outer end, the clamping screws engage the side region of the two tangentially adjacent pressure strips, by means of retaining strips extending axially of the machine. In this known system, the tooth region is thus occupied by the clamping screws for the radial tensioning. The tangential tensioning is not mentioned in this German Patent; it might be possible, by the insertion of suitable wedges into the set of slot segment bar groups, to convert a portion of the radial tension forces into tangential bracing forces. However, in that case the means for radial and tangential bracing of the air-gap winding would not be independent of one another within the various bar receiving slots.

The same is true for a further system of this generic type for fixing an air-gap winding as described in German Published, Prosecuted Patent Application DE-AS 21 65 678. There, for radial bracing of the stator winding bars placed in the slots of a slot-and-tooth system, an insulating cylinder is introduced into the stator bore of the stator lamination packet, but on the condition that the stator winding bars, in their inlaid state, still have a certain radial protrusion beyond the slot teeth, so that by means of the introduced insulating cylinder the bars can be pressed against the base of the slot, far enough that the outside circumference of the insulating cylinder rests on the tops of the teeth. The assembly or dismantling of an insulating cylinder extending over the entire lamination packet length, and which for bringing to bear the required radial bracing forces must have a certain wall thickness, prove to be very difficult. Furthermore, as indicated, only a radial bracing is effected with the insulating cylinder, and if tangential bracing forces were also generated by means of suitable wedges, then it would not be possible to adjust the radial and tangential bracing independently of one another.

It is the object of the invention to embody the generic system for fixing an air-gap winding such that the region of the axial set of slot teeth can be kept free of clamping elements for the radial bracing of the winding during operation, or at least can be embodied such that it becomes possible to accommodate separately adjustable clamping elements for tangential bracing in this region. It should be possible to bring considerable radial clamping forces to bear on the entire inside circumferential surface of the slot segment bar groups, or of the bars of the air-gap winding, and these forces as well should be adjustable. The novel retaining device should occupy little space inside the mechanical air-gap and should also be easy to assemble, test and optionally re-clamp in the event that maintenance work is done.

According to the invention, this object is attained, in a system of this generic type for fixing an air-gap winding, by means of the following characteristics:

a) the retaining device has a multiplicity of support rings in line with one another axially of the machine, which comprise elastically deformable, resilient material, which are divided at least at one point along their circumference and are adjustable in their azimuthal prestressing by means of diameter enlargement in order to generate a radial prestressing force engaging the winding bars, which is greater than the operating force, and b) the supporting rings, for diameter variation upon their assembly and dismantling as well as for post-tensioning, are provided inside the stator bore, in the vicinity of at least one of their dividing seams, with a turnbuckle. Various embodiments of the locking wedge for the turnbuckle.

In accordance with another feature of the invention, the dividing seam lateral surfaces or "flanks" as they will be referred to below, which are facing one another at a distance of the support rings belonging to the turnbuckle taper from radially inward to radially outward over at least a partial distance and can be brought into engagement with the correspondingly shaped counterpart flanks of a tensionable locking wedge, upon the displacement of which in the clamping direction the pressure exerted per unit of surface are between the dividing seam flanks and the counterpart flanks is increased.

In accordance with a further feature of the invention, the dividing seam flanks facing one another at a distance of the support ring ends belonging to the turnbuckle taper or widen from radially inward to radially outward over at least a partial length and widen or taper over at least an adjoining partial length, so that the two support rings form arrowhead-like protrusions or arrow-tail-like recesses aligned azimuthally with one another, which face one another in pairs.

In accordance with an added feature of the invention, the turnbuckle is clampable by means of relative displacement of the locking wedge counterpart flanks with respect to the dividing seam flanks in the radial direction.

In accordance with an additional feature of the invention, the corresponding flank portions of the support ring ends and of the locking wedge extending in tapering or enlarging fashion, respectively, in the radial direction extend tapering in wedge-like fashion in an axial insertion and clamping direction of the locking wedge, having a wedge angle such that self-locking occurs.

In accordance with yet another feature of the invention, the locking wedge, as viewed in the radial direction in its installed state has an approximately trapezoidal bottom face and has an adjusting screw oriented in its axial insertion direction let into its rearward end portion, with the shaft end of which, protruding beyond the contour of the support ring, the locking wedge of the turnbuckle of an axially adjacent support ring can be brought into contact, in such a manner that with turnbuckles, disposed in axial alignment with one another, of the axially aligned and assembled support rings, the preceding locking wedge of a given aligned pair is fixed in its adjusted position by the respectively succeeding locking wedge, with the respective first and last support ring in the axial set being axially fixed at the slot and tooth system.

In accordance with yet a further feature of the invention, the adjusting screw is embodied as a stud bolt and is supported with its threaded shaft in a threaded blind bore of the rearward end portion of the locking wedge and on a free end adjoining the threaded shaft has a threaded polygon for access by monkey wrenches, as well as having the protruding shaft end adjacent thereto, and that in the vicinity of the free end of the adjusting screw, the rearward end portion of the associated locking wedge and/or the contacting face end of the adjacent support ring is set back or recessed for the sake of accessability to the threaded polygon. Pressure-distribution and spring elements, which are introduced as pressure-transmitting elements between the outer circumference of the support ring and the inner circumference of the sides of the bars are provided or follows.

In accordance with yet an added feature of the invention, spring elements, in particular strip-like wave springs, are inserted in between the outside circumference of the support rings and the abutting winding bar sides.

In accordance with yet an additional feature of the invention, spring guide beds having the cross section of a flat U are introduced in between the wave springs and the support rings, the wave springs being received by the U-shaped channel of the spring guide beds.

In accordance with still a further feature of the invention, the support rings preferably comprise fiber-reinforced synthetic resin (FvK), because support rings of this material have a relatively low eight, that is, a low weight in comparison with steel, and nevertheless can exert considerable spring-elastic bracing forces.

In accordance with still an added feature of the invention, the winding bars or the slot segment bar groups are supported with prestressing by pressure pieces disposed on the top of the slot teeth, and the pressure pieces are retained by means of clamping screws disposed radially in the vicinity of the slot teeth and anchored in abutments of the stator lamination packet, the pressure pieces and the clamping screws are radially outwardly recessed with their heads with respect to the outside circumference of the support ri s, and the pressure pieces, for tangential prestressing of the winding bars, engage the heads of wedge strips, which are inserted into wedge interstices between the slot teeth and the respective contacting winding bar side. These features attain secondary object of further embodying the system according to the invention such that in addition to the radial bracing by means of the support rings and regardless thereof, a separately adjustable tangential bracing for the bars or the slot segment bar groups can be disposed in the vicinity of the axial set of slot teeth and performed, without having to provide inflatable pressure hoses for this purpose inside spaces between the bars.

Based on the known system for fixing an air-gap winding in accordance with German Patent 29 24 863 mentioned above, in which the winding bars, or the slot segment bar groups, are supported with initial tension by means of pressure pieces disposed on the head of the slot teeth and the pressure pieces are retained by means of clamping screws disposed radially in the vicinity of the slot teeth and anchored in abutments of the stator lamination packet, the secondary object is attained by the characteristics disclosed in the preceding paragraph, and a further embodiment of that system is disclosed by means of such feature, in accordance with still an additional feature of the invention, in that in radial alignment with the heads of the clamping screws, openings in the support rings are provided, through which a clamping tool can engage the heads of the clamping screws, accessing them from the inside circumference of the stator bore. Post-tensioning of the tangential bracing is made possible even with the support rings int he assembled state.

The subject of the invention is also a method for assembly and dismantling of a system as defined by the aforementioned features inside the stator bore, by means of which the object is attained of adapting the disposition of the support rings over the entire axial length of the stator lamination packet to the fact that the winding bars or the individual slot segment bar groups can be assembled only in succession on the inside circumference of the the stator lamination packet, wherein despite the unavoidable effects of settling of the bar insulation as well as of the slot washers and shims, a defined radial bracing and correspondingly a tangential bracing as well can be brought to bear.

This object is attained in accordance with a method for assembly and dismantling of a system as defined above, inside the stator boring by means of the following steps.

a) the winding bars of one slot segment bar group, which are put into place together with wedge strips and optionally pressure pieces and slot-side wave spring strips, into the bar receiving slot between two successive slot teeth, are radially and tangentially pre-stressed by means of curved shell plate pieces extending at least from one tooth head to the next and distributed over the axial winding bar length, and are shaped as well as made to pre-settle by means of this prestressing as well as under the influence of temperature; that b) in the described manner, the slot segment bar groups and the associated curved shell plate pieces are assembled over the entire inside circumference of the stator lamination packet to make circumferential units that axially succeed one another with respective spacing interstices between them, and the associated slot segment bar groups are made to be shaped and pre-settled; and that c) the individual circumferential units of the shell plates are successively dismantled, beginning at an axially outer end of the stator lamination packet inside circumference and proceeding inward or to the other, outer end and are replaced by the support rings; and that for dismantling of the support rings and/or individual ones, or all of the slot segment bar groups, the support rings are successively replaced in reverse order with curved shell plate pieces, and for dismantling of individual slot segment bar groups, the axial set of the particular shell plate are pieces that are located in the circumferential vicinity of the slot segment bar groups to be removed is dismantled.

The advantages attainable with the invention are above all that the support rings can engage the inside circumference of the winding bars or slot segment bar groups over a large surface area and with uniform transmission of force as well as the generation of high radial clamping forces, so that in combination with the tangential bracing, high security against loosening of the winding bars is assured both in power operation and in the shortcircuit situation. The support rings are easy to dismantle and reassemble, adjust, test and post-tension.

In conjunction with the drawing, showing a plurality of exemplary embodiments of the invention, these embodiments will now be described in further detail.

The drawing, for the most part in simplified, schematic form, shows the following:

Figures 1, 18:
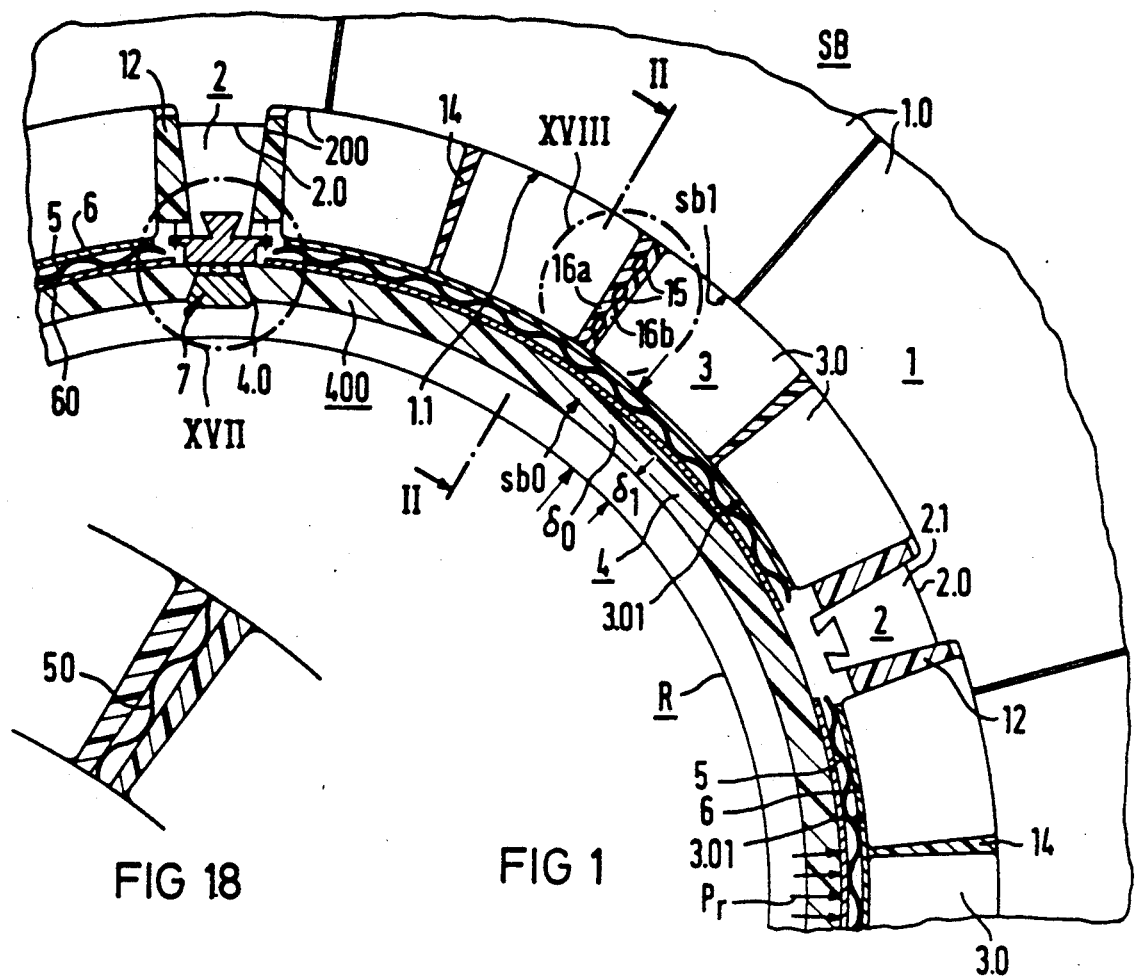
FIG. 1 is an axial-normal fragmentary section extending over somewhat more than one-fourth of the circumference, which shows a first exemplary embodiment of a fixing system having a support ring and a turnbuckle serving to enlarge its circumference.
Figure 17:
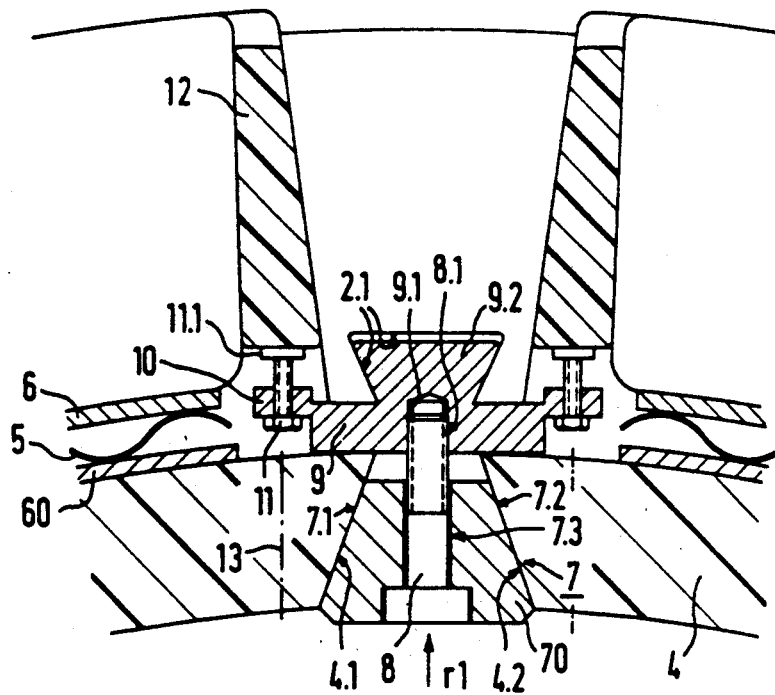

FIG. 17 shows the detail XVII of FIG. 1, that is, a further embodiment of the wedge bracing for the support rings for generating radial clamping forces, and a wedge bracing independent thereof on both sides of the slot teeth for generating a tangential initial tension for the winding; and FIG. 18 is a variant of the spring-elastic tangential bracing of detail XVIII of FIG. 1, having a slot-side wave spring between two winding wedges.

Figure 2:
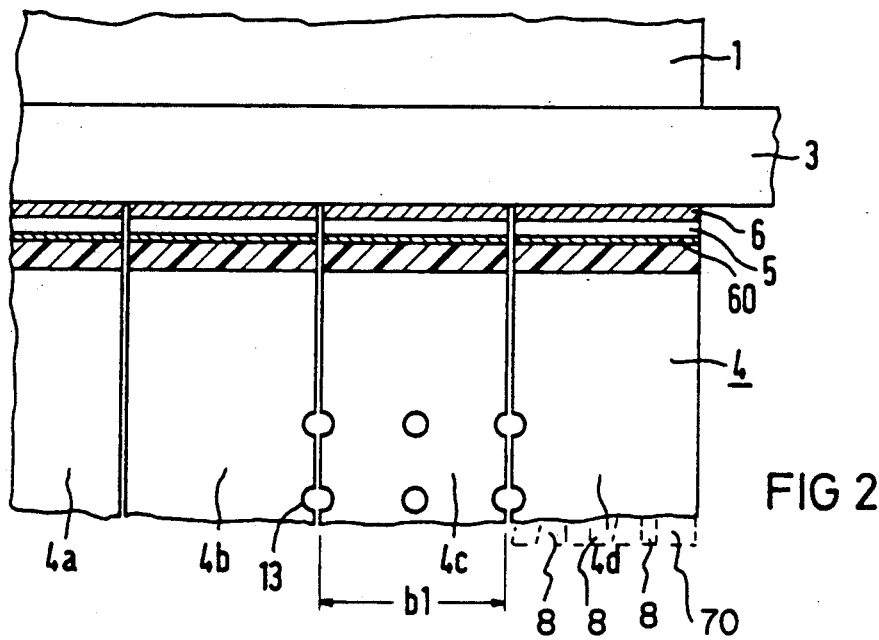
FIG. 2 is an axial fragmentary section taken along the line II—II of FIG. 1.

In FIGS. 1 and 2, a stator lamination packet, identified as an entity as SB, of a dynamo-electric machine, in particular a turbo-generator having an air-gap winding 3, is shown schematically in a detail showing approximately one quadrant. The invention relates to the fixing of this air-gap winding 3 on the inner circumference of the stator lamination packet SB. The latter, with its inner circumference $\delta_0$, defines the stator bore for the machine rotor R, shown only schematically in its outline, rotating in it with the air gap $\delta_0$. The stator lamination packet SB is composed of a laminated, approximately circular-cross-section shielding packet 1 in the so-called yoke region, the individual lamination segments 1.0 of which comprise magnetic material, and a slot and tooth system 200 disposed on the inside circumference of this shielding packet 1 having slot teeth 2 built up from nonmagnetic sheet metal, wherein the small plates, of approximately trapezoidal outline, of the slot teeth are each rigidly connected, in the vicinity of the abutment points 2.0, to the respective adjoining lamination segments 1.0 of the shielding packet 1. The connection takes place in particular in the vicinity of the "seams" or abutment points by means of electron beam welding, or laser welding, which is even more favorable, because this makes it possible to eliminate undesirable distortion. The seams or abutment points 2.0 in the exemplary embodiment shown are located on circular arcs. However, the invention is not restricted to this; the decisive factor is that the slot and tooth system 200, at least in the vicinity of the bore region, comprises nonmagnetic material, and in particular nonmagnetic steel plates; the abutment points may also have a V- or W-shaped course, by way of example. The air gap $\delta_0$ is the magnetic air gap for the field lines. The mechanical air gap $\delta_1$ will be explained later herein.

The schematically indicated winding bars or "bar groups" 3.0 of the air-gap winding 3 are introduced into the circumferential interspaces, serving as axially parallel bar receiving slots sb1, which are each defined in the tangential direction by successive slot teeth 2; these winding bars 3.0 are fixed in their inserted position by means of a retaining device 400 that can be assembled from the stator bore sb0 and that rests over a large surface area on the winding bar sides 3.01 oriented toward the stator bore and forcing the winding bars or "bar groups" 3.0 against the slot base 1.1. At least in the radially unbraced state, the winding bars or "bar groups" 3.0 protrude with a radial excess into the air gap, so that the force lock with the retaining device can be established thereby.

As FIG. 1 in combination with FIG. 2 shows, the retaining device, identified as an entity as 400, has a plurality of support rings 4, individually identified as 4a, 4b, 4c, 4d, etc, disposed in succession axially of the machine. These rings comprise elastically deformable resilient material and are split at at least one point 4.0 on their circumference (FIG. 1). Because of this dividing seam, it is possible to adjust the support rings by means of diameter enlargement in their azimuthal initial tension, to generate a radial pre-stressing force $P_r$ engaging the winding bars or "bar groups" 3.0 that is greater than the operating force acting in the radial direction. For a winding bar or "bar group" 3.0, the force vectors $P_r$ are shown schematically for the sake of illustration. So that this diameter change can be accomplished easily and conveniently both during assembly and dismantling as well as during post-tensioning, inside the stator bore, the support rings 4 are provided in the vicinity of at least one of their dividing seams 4.0, with a turnbuckle 7. The mechanical air gap $\delta_1$ is produced between the inside circumference of the support rings 4 and the outside circumference of the rotor R.

A first embodiment of this turnbuckle is shown in the detail XVII of FIG. 17 and includes a turnbuckle wedge 70 and a turnbuckle plate 9 connected by clamping screws 8. As this drawing shows, the dividing seam flanks 4.1, 4.2, facing one another at a distance, of the ends of the support ring 4 belonging to the turnbuckle 7 extend with a taper from radially inward to radially outward, so that an approximately trapezoidal outline is produced in the axial fragmentary view of FIG. 17, and can be brought into engagement with the complementarily shaped counterpart flanks 7.1 and 7.2 of the tightenable turnbuckle wedge 70 in such a manner that upon displacement of the wedge 70 in the clamping direction r1, the pressure per unit of surface area between the respective dividing seam flanks 4.1, 4.2 resting against one another and the associated counterpart flanks 7.1, 7.2 is increased. Since the wedge 70 shown in FIG. 17 extends preferably over the entire axial length b1 of the associated support ring 4, a plurality of the clamping screws 8 are to be distributed over this length b1, for example three clamping screws 8 should be distributed uniformly over the length b1. One such clamping screw 8 (FIG. 17) is supported in a corresponding radially oriented bore 7.3 of the wedge 70; this screw is, in particular, a socket-head screw, which as shown is disposed with its head countersunk in the wedge 70. The thread end 8.1 of the clamping screw 8 engages a threaded bore 9.1 of the turnbuckle plate 9, so that when the clamping screw 8 is tightened, corresponding azimuthal clamping forces, that is, forces oriented in the circumferential direction, are transmitted to the support ring 4, widening it and causing the radial clamping forces $P_r$ to be transmitted from the support ring to the inside circumference of the air-gap winding 3.

The turnbuckle plate 9 is torsionally fixed by means of a separate turnbuckle plate 9.2, which is inserted in a form-locking manner with a dovetail profile into the dovetail slot 2.1 of the tooth 2 and with its "vanes" or lateral strip-plate portions 10 forms thread eyes for further clamping screws 11. The further screws 11, with the pressure pieces 11.1 at their ends, engage the radially inner head faces of the wedges 12 used for tangential bracing. A multiplicity of additional clamping screws 11 are distributed over the axial length of the turnbuckle plate 9 in the threaded bores of the lateral strip plate portions 10, and the turnbuckle plates 9 along with their lateral strip-plate portions 10, 9.2 are suitably subdivided into axial portions, for example in accordance with the axial extension of the support rings 4. If the abutting or associated support ring 4 has not yet been installed, then accessibility to the additional clamping screws 11 is readily possible from the inside circumference of the bore; that is, the stator winding introduced with its winding bars or "bar groups" 3.0 into the bar receiving slots sb1 can be pre-stressed in the tangential direction by means of the tangential clamping wedges 12 and the associated clamping screws 11. To enable post-tensioning, once the associated support ring 4 has been installed, the support rings can, as shown in FIG. 2, be provided with suitable bores 13.

From FIG. 1, in addition to the tangential clamping wedges 12, which are disposed on the side flanks of the slot teeth, still additional intermediate wedges 14 are also visible. Like the clamping wedges 12, these intermediate wedges 14 are preferably of fiber-reinforced plastic (FvK) of high electrical breakdown resistance. In the middle of the slot and tooth system 200, a system of pressure hoses 15 is shown in FIG. 1, instead of an intermediate wedge 14, in order to indicate that instead of or in addition to the tangential clamping wedges 12, a pre-stressing of the winding in the tangential direction could also be performed by such inflatable pressure hoses 15, which are disposed in the hollow spaces in between two wedge halves 16a, 16b preferably disposed symmetrically with one another. Such pressure hoses can be subjected to a pressure fluid, the pressure being monitored continuously. However, in the context of the present invention a spring-elastic tangential bracing achieved by means of slot-side wave springs 50 of FvK (fiber-reinforced plastic) is preferred; as shown in FIG. 18, these springs 50 should be inserted between the bar groups 300 or bars 3.0 and the wedges 12 or 14 (see the variant for system pressure hoses 15, 16a, and two wedge halves 16b in FIG. 18). Especially with such slot-side wave springs 50, the bracing of the air-gap winding 3 in the tangential direction by the clamping wedges 12 and the clamping screws 11 which form mechanical wedge bracing means is particularly advantageous, because then continuous pressure monitoring, or monitoring for tightness, is unnecessary; a possible post-tensioning in the course of maintenance work is all that is necessary. The slot-side wave springs are pre-stressed in a defined manner; they increase the friction locking counteracting pulsation forces in the radial direction.

In FIGS. 1, 2 and 17, reference numeral 5 indicates additional spring elements providing the spring-elastic radial bracing, in the present case being plastic wave spring strips, while reference numeral 6 indicates pressure strips that cover the insides of the bars oriented toward the wave spring strips 5 and distribute the radial clamping forces $P_r$ uniformly to the winding bars or "bar groups". It is suitable to provide further pressure strips 60 on the side of the plastic wave spring strips 5 oriented toward the associated support spring 4, as indicated in FIG. 17, in order to protect the support ring 4 from local overload.

Figure 6:
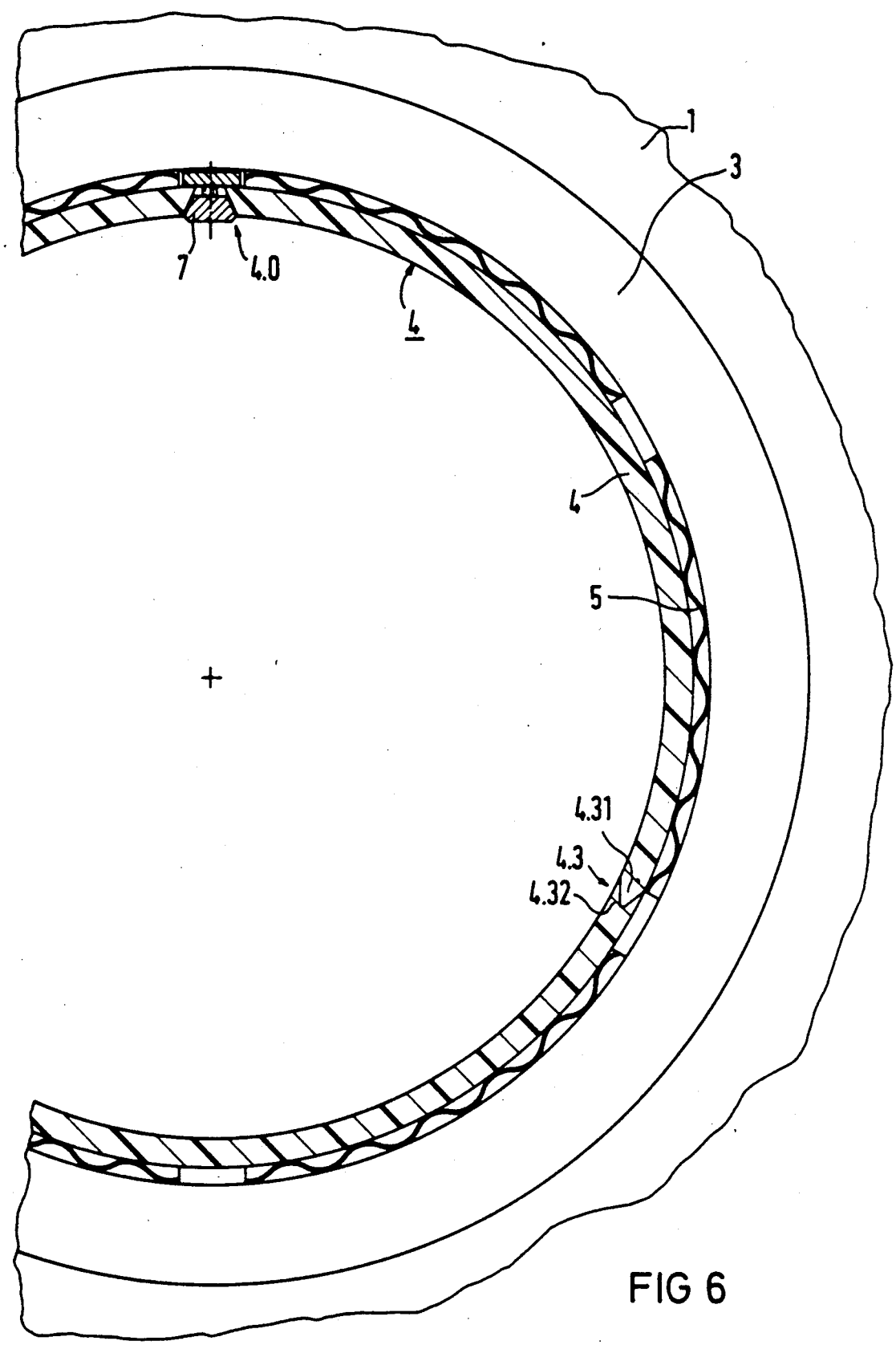
FIG. 6 shows a support ring which has more than one dividing seam, that is, one seam for assembly of the turnbuckle and a further seam as a dividing seam, the location of the air-gap winding being indicated in this drawing figure merely by a ring-shaped zone.

In a highly simplified manner, FIG. 6 shows a second exemplary embodiment, in which the support ring not only has a partial seam 4.0 for assembling the turnbuckle 7, but also a further dividing seam 4.3, and in the vicinity of the other half of the support ring (this half is not shown) has another dividing seam, so that the support ring 4 comes apart into a total of three curved support ring pieces, which upon assembly can be assembled in a form-locking manner to make a complete support ring curve. The dividing seam 4.32 represents a preferred embodiment: The two abutting support ring parts engage one another with an arrowhead part 4.31 and an arrow-tail part 4.3. Assembly and dismantling are facilitated by this multi-part arrangement of the support ring. The system is otherwise as described in connection with FIGS. 1, 2 and 17.

Figure 8:
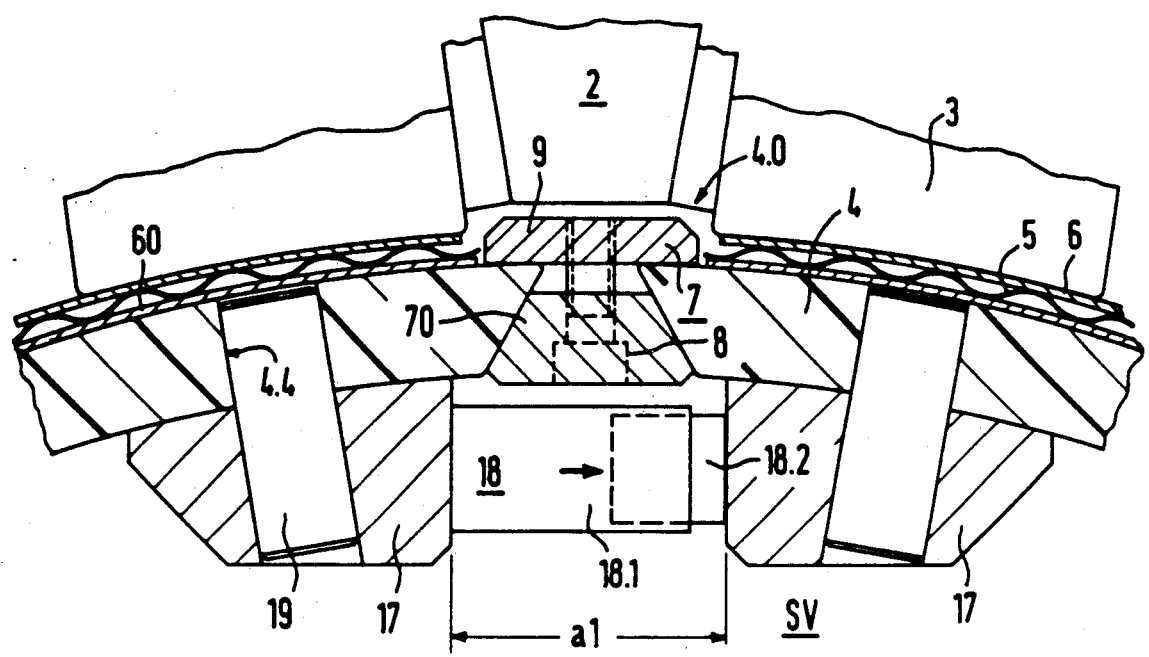
FIG. 8 is a fragmentary section taken along the line VIII—VIII of FIG. 7.
Figure 7:
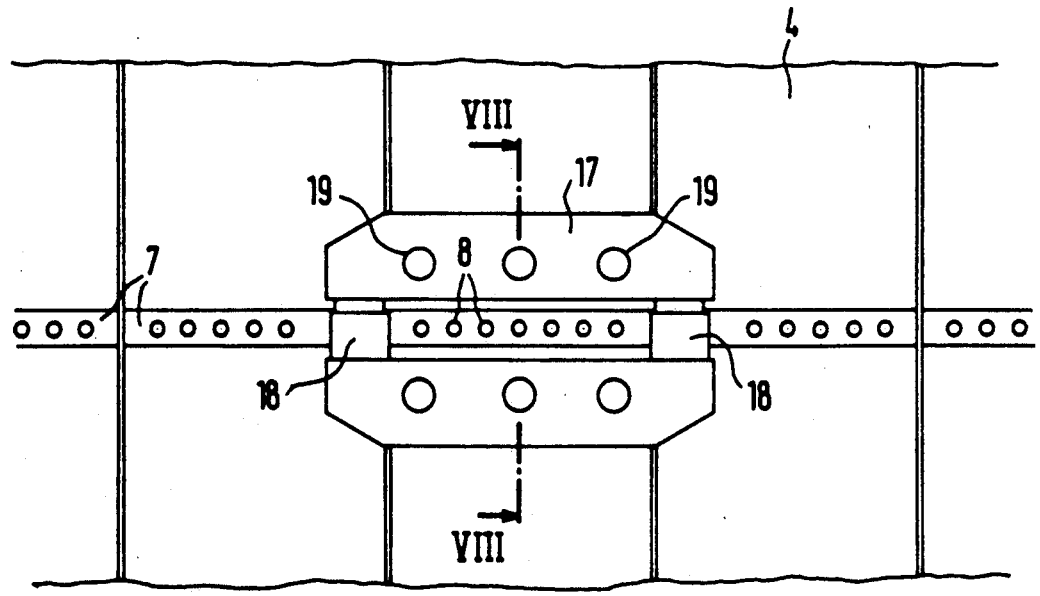
FIG. 7 is a radial plan view on the inside circumference of a hydraulic or pneumatic clamping device for the defined prestressing of the particular support ring, so that the associated turnbuckle can correspondingly easily be post-tensioned.
Figure 9:
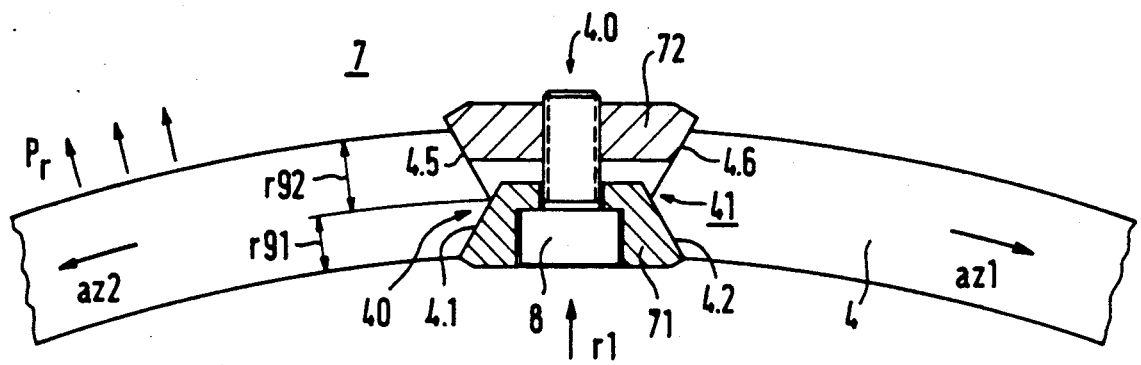
FIG. 9 shows a support ring having flanks opposing one another in the manner of arrowheads, and counterpart flanks, correspondingly embodied like the tails of arrows, of the associated turnbuckle, in which the clamping screw is oriented radially.

FIGS. 7 and 8 shows a turnbuckle 7 which is embodied like that of FIGS. 1, 2 and 17; for the sake of a simpler drawing, the strip plate portions 10, clamping screws 11 and clamping wedges 12 are not shown here. In FIGS. 7 and 8, the intent is simply to explain a hydraulic or pneumatic clamping device SV, which has two solid pressure strips 17 located opposite one another and spaced apart from one another by a distance a1, which are variable in their mutual spacing by means of two fluidic power piston and cylinder systems 18 disposed one at each end of the strips. The cylinder is shown at 18.1 and the power piston at 18.2. The illustration is merely schematic, omitting the fluid hoses and fluid valves used for actuation. The pressure strips 17, which are adapted in their outer contour to the circular inside contour of the associated support ring 4, are rigidly coupled by means of anchoring bolts 19 to the end regions of the support ring 4 on both sides of its dividing seam 4.0. As FIG. 7 shows, three such anchoring bolts 19 are provided per pressure strip 17; the two ends of the support ring 4 to be brought into engagement thereby correspondingly each have three receiving bores 4.4. Accordingly, by means of the hydraulic or pneumatic clamping device SV, the associated support ring 4 can be spread apart in its azimuthal direction and then the locking wedge 70 can be adjusted with its clamping screw 8. After the adjustment of the locking wedge 70 and the unclamping of the system 18, the clamping device SV can then easily be dismantled and put back into position on the next support ring that is to be clamped. FIG. 9 shows the embodiment of a turnbuckle 7 in which the dividing seam flanks 4.1, 4.2 facing one another at a distance of the ends of the support ring 4 that belong to the turnbuckle extend such that they taper from radially inward to radially outward over at least part of the length r91, while over an adjoining radial portion r92, in the form of flanks 4.5, 4.6, they do not taper in wedge-like fashion but instead widen again in wedge-like fashion, so that the two ends of the support ring 4 form arrowhead-like protrusions oriented toward one another in azimuthal fashion and facing one another in pairs. The protrusions are shown at 40 and 41. Arrowhead-like protrusions on the facing ends of the support ring 4 have the advantage that the clamping forces of the locking wedge engaging them, the locking wedge in the present case comprising two parts 71 and 72, produce inwardly oriented force components, as a result of which the ends of the support ring 4 cannot spread apart or open. The part 72 at the same time performs the function of a turnbuckle plate, and because of its rectangular outline this second locking wedge 72 is at the same time torsionally fixed on the facing flanks 4.5, 4.6.

Figure 10:
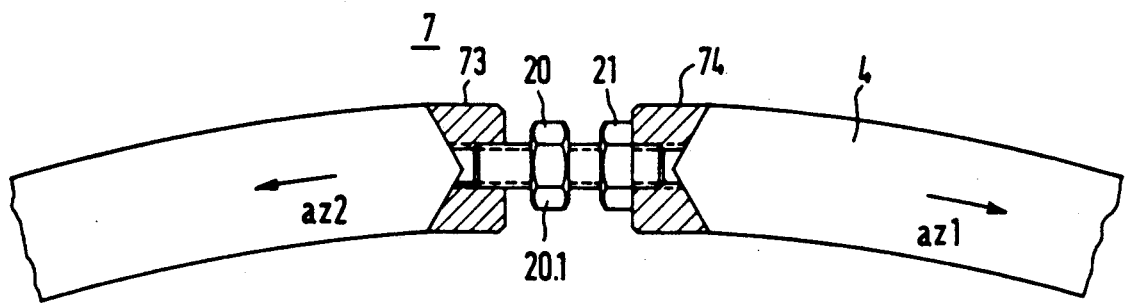
FIG. 10 shows a further exemplary embodiment of the turnbuckle, in which the flanks of the support ring and the counterpart flanks of the turnbuckle are embodied as in the example of FIG. 9, but in which the clamping screw is oriented tangentially and with its two thread ends engages a counterclockwise or clockwise thread of the two turnbuckle halves, respectively.

In the example of FIG. 9, the clamping forces oriented in the radial direction r1 are converted into azimuthal spreading forces indicated by the arrows az1, az2, which in turn, by contact with the inside circumference of the air-gap winding 3, lead to the radial bracing forces $P_r$ already mentioned. In the example of FIG. 10, the arrowhead-like end contour of the ends of the support ring 4 has been maintained, but the turnbuckle 7 here has arrow-tail-like recesses on pressure pieces 73, 74 resting against the support ring ends, and these pressure pieces, by means of a plurality of forcing screws 20 distributed over their axial length, lead to the azimuthal spreading apart of the support ring 4 in the direction of the arrows az1 and az2. The forcing screw 20 is suitably provided with a counterclockwise thread on one end and a clockwise thread on its other end and is supported in corresponding threaded bores of the pressure pieces 73, 74; reference numeral 21 indicates a check nut. By engaging the nut 20.1 of the clamping screw 20 with a threaded wrench, a spreading apart can be attained, but in this embodiment, because of the high clamping forces, the hydraulic clamping device of FIGS. 7 and 8 is used for pre-stressing, and in the spread-apart state an adjustment of the clamping nut 20 then takes place.

A fourth exemplary embodiment for a turnbuckle 700 will now be described in connection with FIGS. 11-14; its clamping direction is not the radial direction r1, but rather a direction x1 located parallel to the axial direction of the machine. The locking wedge 70 (see FIG. 12) has an approximately trapezoidal bottom face, viewed in the radial direction of its installed state, and has an adjusting screw 701 oriented in its axial insertion direction x1 and let into the rearward end of the locking wedge 70; with the shaft end 702 of this screw that protrudes beyond the contour 22 of the support ring 4, the locking wedge 70 of the turnbuckle 700 of an axially adjacent support ring 4 can be brought into abutment. It is thus attained that with axially aligned turnbuckles 700 of the axially successive assembled support rings 4, the preceding locking wedge 70 in any aligned pair is fixed in its adjusted position by means of the locking wedge 70 that follows it. The first and last support ring 4 in the axial set must be axially fixed against the slot and tooth system 200, as will now be described in conjunction with FIGS. 11, 13 and 14.

These drawings show the axial channel 23 in the slot teeth. Cylindrical abutment bodies 24 that fit them are introduced into these axial channels 23, which are of circular cross section; the abutment bodies are preferably of non-magnetic steel, and their jacket, like their threaded bore 24.1, is provided with an insulating plastic layer. The abutment bodies 24 can also be made entirely of FvK. The threaded bore 24.1 of the abutment bodies 24 points precisely in the radial direction, so that radial fixation screws 26, lined with hollow-cylindrical pressure sleeves 27, can be inserted through corresponding radial bores 25 and with their ends screwed into the abutment bodies 24. The pressure sleeves 27 fit precisely into the bores 25, so that the associated support ring 4 is thereby blocked against axial movement. This axial blocking according to FIGS. 13, 14, as mentioned, is provided on both axial ends of the stator lamination packet SB.

Figure 11:
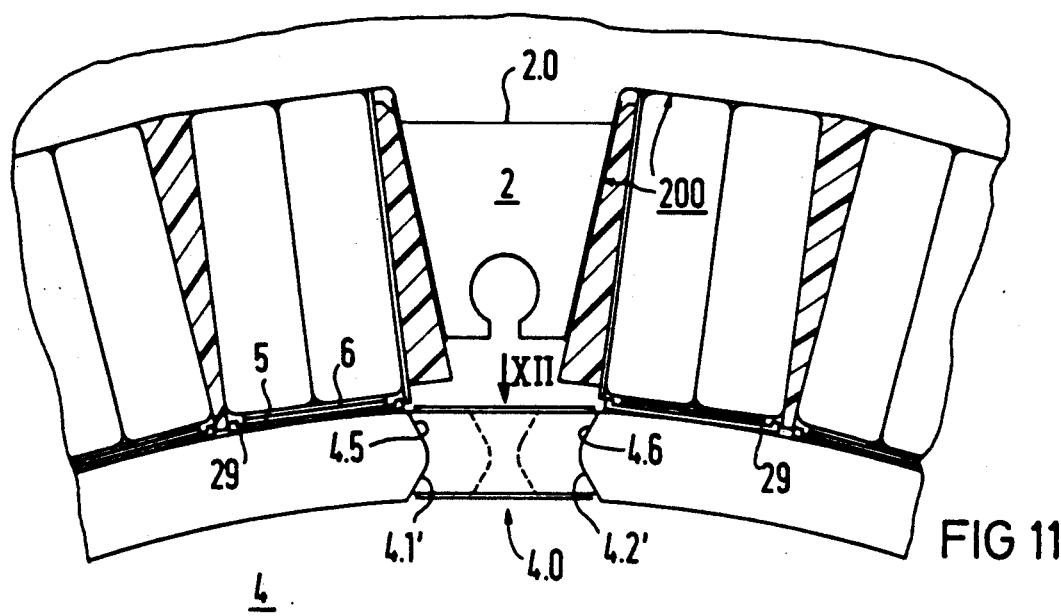
FIG. 11 is an axial view of a slot and tooth system having winding bars in place in it and a pre-stressed support ring contacting it, shown in detail and with a further embodiment of a turnbuckle.
Figure 12:
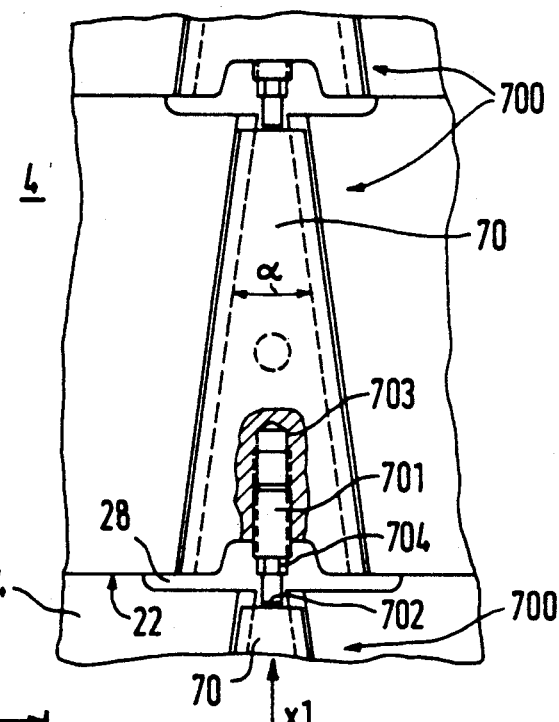
FIG. 12 is the view XII of FIG. 11 on the inserted turnbuckle, in which the axially adjacent two support rings in the associated turnbuckles can be seen in detail.
Figure 13:
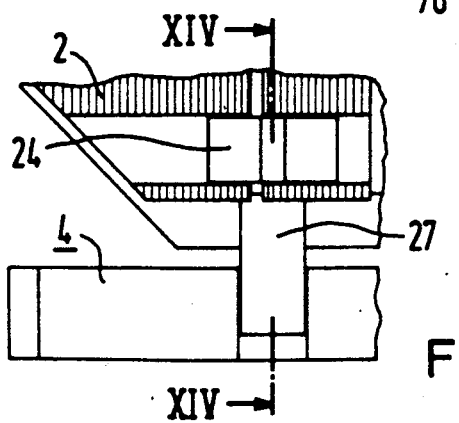
FIG. 13 is a fragmentary axial section of a system for fixation of the final support ring, as viewed in the axial direction.
Figure 14:
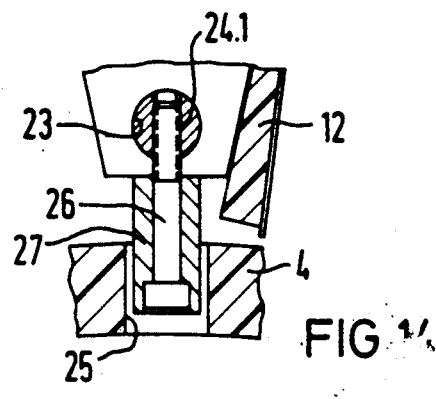
FIG. 14 is a fragmentary section taken along the line XIV—XIV of Fig. XIII.

To return to the turnbuckle 700 of FIGS. 11 and 12: It can be seen that the adjusting screw 701 is embodied as a stud bolt, and is supported with its threaded shaft in a corresponding threaded blind bore 703 of the rearward end of the associated blocking wedge 70 and on a free end adjacent to the threaded shaft has a threaded polygon 704 for access by monkey wrenches or the like. The threaded polygon 704 is then followed by an end 702 of the adjusting screw 701. In the vicinity of the free adjusting screw end 702, the rearward end of the associated blocking wedge 70 is recessed somewhat, as shown, and the contacting end face of the adjacent support ring 4 is recessed in the form of the recess 28, for the sake of accessibility to the threaded polygon 704. Since the axial length of the associated support ring 4 is greater by a multiple than its radial thickness, the respective locking wedge can be provided with a small wedge angle of 10° (angle at the tip of the wedge). This kind of small wedge angle produces self locking, when FvK (fiber-reinforced plastic) is the material used. This considerably facilitates assembly and dismantling of the support rings, because the assembled and already wedged-together support ring needs no further locking during the assembly process. The additional mutual locking of the locking wedges 70 with one another, with the and of the adjusting screws 701, is accomplished, with a view to the forces of impact and vibration, during the operation of the electrical machine.

The wedge flanks at the ends of the support ring in the vicinity of the dividing seam 4.0 are once again embodied in the manner of arrow heads, but the dividing seam flanks 4.1', 4.5' and 4.2', 4.6' taper in the direction xl in accordance with the indicated wedge angle and as can be seen in dashed lines in FIG. 11. With this system as well, it is suitable to use an additional hydraulic clamping tool as indicated in FIG. 7 and FIG. 8.

FIG. 11 shows still another detail: Between the wave springs 5 and the support rings 4, flat spring guide beds 29 of U-shaped cross section are introduced, the wave springs 5 being received by the U-shaped channel of the spring guide beds. The legs of the U comprising the spring guide beds 29 protrude radially into the free interstices that remain as, a result of the rounding off of the edges of the winding bars or "bar groups" 3.0. The spring guide beds always assure an unequivocally defined position of the wave springs 5.

Figure 16:
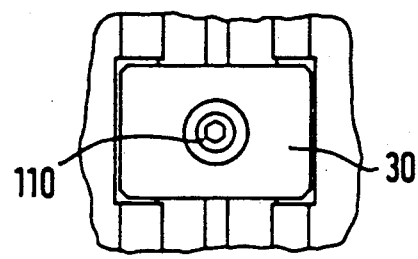
FIG. 16 is the radial fragmentary view XVI of FIG. 15 showing the pressure piece of rectangular outline.
Figure 15:
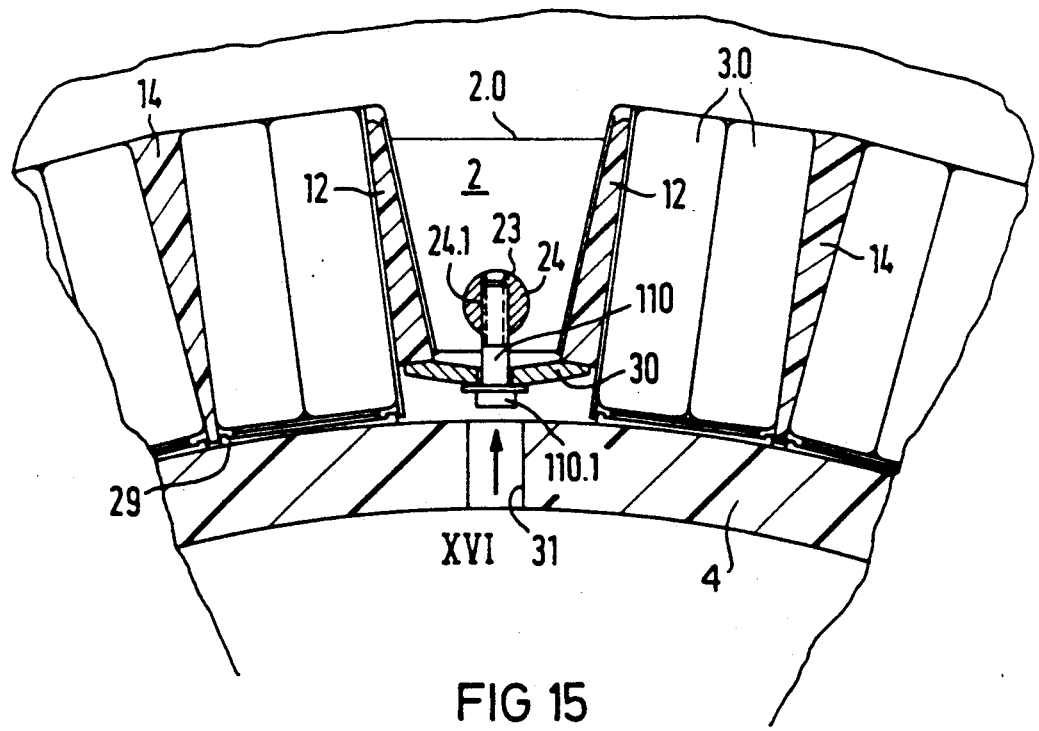
FIG. 15 is a slot and tooth system corresponding to FIG. 11, but in which a radial clamping screw, which serves to generate a tangential initial tension, is anchored in an axial anchor bolt of the slot tooth.

FIGS. 15 and 16 show a system for tangential bracing of the air-gap winding 3 that is modified by comparison with the embodiment of FIGS. 1, 2 and 17, and in this embodiment the winding bars 3.0, or the slot segment bar groups made up of a plurality of bars, are supported with initial tension by means of pressure pieces 30 disposed at the top of the slot teeth 2, and these pressure pieces 30 are retained by means of clamping screws 110 disposed in the vicinity of the slot teeth and anchored in abutments 24 of the stator lamination packet SB. As can be seen from FIG. 15, the pressure pieces 30 and the clamping screws 110 are recessed radially outward with their heads 110.1 with respect to the outside circumference of the support rings 4. For the sake of the tangential pre-stressing of the winding bars or "bar groups" 3.0, the pressure pieces 30 engage the heads of wedges 12, which—as in the first embodiment of FIGS. 1, 2 and 17—are inserted into wedge interstices between the slot teeth 2 and the respective side of the winding bar in contact with them. The disposition of the axial channels 23 and of the cylindrical abutment bodies 24 inserted into them, with their threaded bores 24.1, is as has already been explained in connection with FIGS. 13 and 14. In FIG. 11, the elements for tangential bracing have not been shown, for the sake of simplicity. Similarly to the illustration of FIG. 14, in the tangential bracing means of FIGS. 15 and 16, one opening 31 is provided in each support ring 4, in radial alignment with the heads of the clamping screws 110, so that a clamping tool can engage the heads 110.1 of the clamping screws 110 through these openings 31 from the inside circumference of the stator bore. In this manner, the adjustment of the tangential bracing by means of the clamping screws 110 can be accomplished independently of the radial bracing by means of the support rings 4 and their turnbuckles 7 or 700, which is of particular importance because of the considerable pulsating radial and tangential forces that arise during operation. The pressure piece 30, which may be of steel or fiber-reinforced plastic, is embodied as a plate spring, which is pre-curved and flattens somewhat when the clamping screw 110 is tightened, resting with its flat long edges on the heads of the wedges 12 and pressing them farther into their wedge slots, so that as a result corresponding tangential bracing forces are exerted upon the air-gap winding or upon its individual winding or "bar groups" 3.0.

Figure 3:
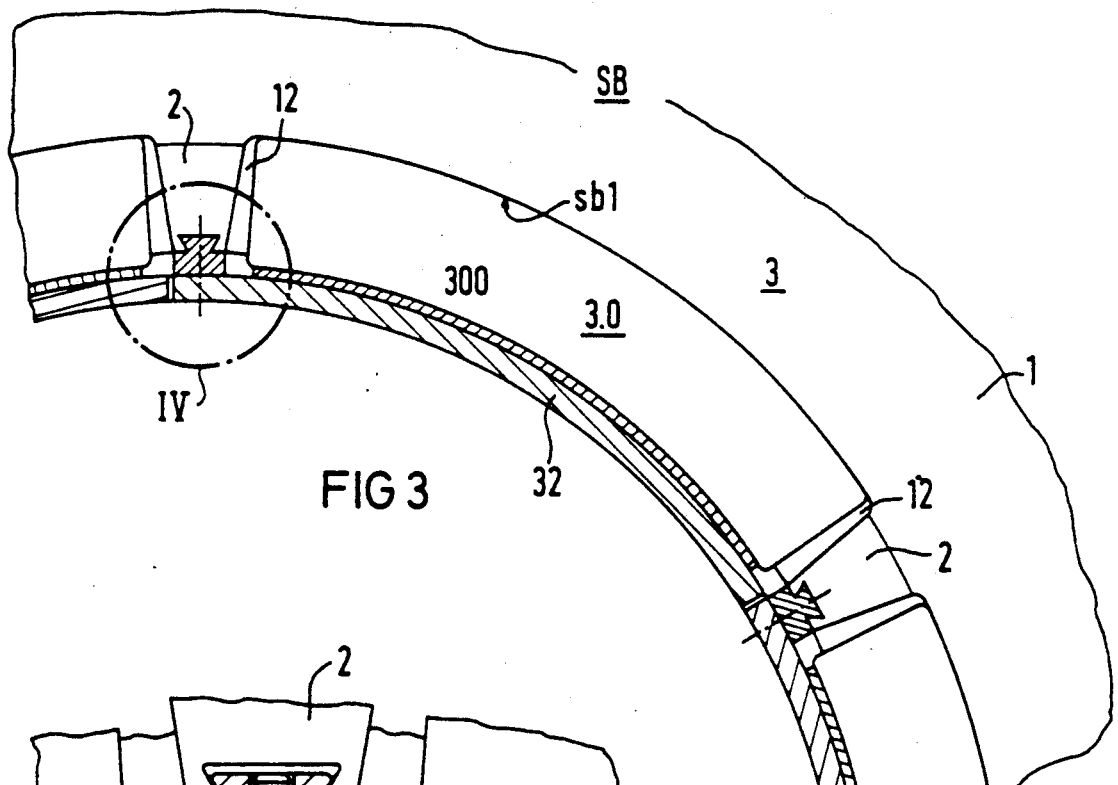
FIG. 3 is an axial normal fragmentary section of a shell-plate system for pre-assembly of the air-gap winding.
Figure 4:
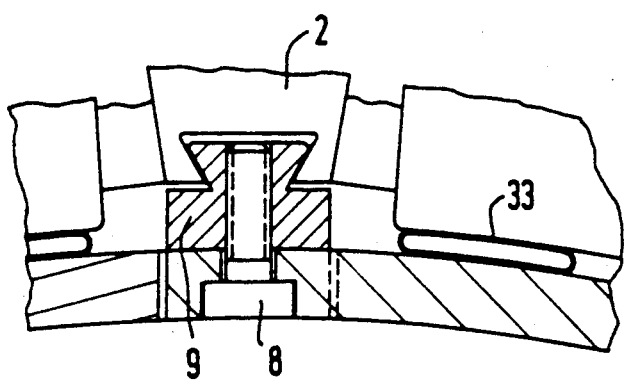
FIG. 4 shows the detail IV of FIG. 3 on a larger scale.
Figure 5:
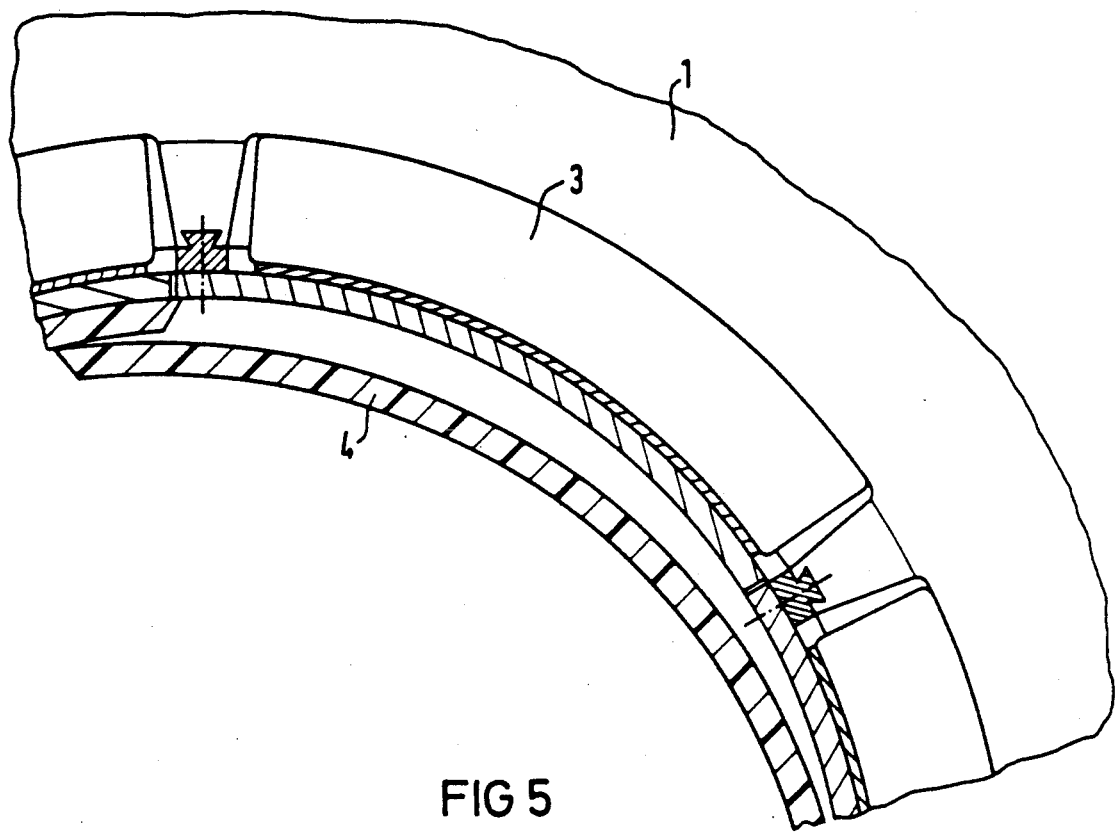
FIG. 5 shows the subject of FIG. 3 with a support ring of reduced diameter, introduced into the stator bore and intended to replace the shell plates.

FIGS. 3–5 further illustrate the preferred method for assembly and dismantling of a system in accordance with the above-described FIGS. 1, 2, 17 as well as 6–16. FIG. 3 shows curved shell plates 32, which have the axial width of the support rings 4 to be introduced later, as well as approximately their radial thickness. In the circumferential direction, they extend from one tooth 2 to the next tooth with a certain excess length, so that in this region they can be fixed by means of the radial clamping screws 8 to the turnbuckle plates 9. Preferably, shell plates 32 adjacent one another mesh with one another with teeth in this tooth region, so that one or the other shell plate 32 can be fixed in alternation by means of the clamping screws 8. The above-mentioned sandwich system comprising pressure strips 6, wave springs 5 and additional pressure strips 60 can be associated with the slot segment bar groups or bars 3.0 of the air-gap winding 3, which are introduced into the bar receiving slots sb1, and with the shell plates 32, which is summarily suggested in the drawing by means of a shaded strip. During this pre-assembly of the air-gap winding 3, however, an intermediate layer 33 comprising pneumatic cushions can also be disposed between the shell plates 32 and the air-gap winding 3. In other words, once the corresponding slot segment bar group 300 has been put into plate in its slot sb1, the curved shell plate pieces 32 are assembled, and as a result the bar group 300 is pre-stressed both tangentially and radially. The means for tangential pre-stressing have not been shown in FIGS. 3 and 4; they may be embodied in the manner described in conjunction with FIG. 17 or FIG. 15. With this pre-stressing taking place and under the influence of temperature, the associated bar group 300 is then formed, and also, along with its winding insulation, made to pre-settle; that is, a change in shape of the bar groups 300 or individual bars 3.0 that later arises during operation in response to electrical, mechanical and temperature stress, is made to happen beforehand. In the manner described, all the slot segment bar groups 300 with the associated curved shell plate pieces 32 are assembled over the entire inside circumference of the stator lamination packet SB to form circumferential units that succeed one another, each spaced apart from another with interstices between, and the associated slot segment bar groups 300 are caused to be shaped and pre-settled under the influence of temperature.

The individual circumferential units of the shell plates or shell plate pieces 32 can now be progressively dismantled in succession, beginning at an axially outer end of the stator lamination packet inside circumference, and proceeding inward or toward the other, outer and replaced with the support rings 4. The dismantling of the shell plates and their successive replacement can also be begun in the middle of the stator lamination packet, then proceeding toward both axial ends. FIG. 5 shows that a support ring 4 the diameter of which is reduced by means of pushing its ends over one another can easily be inserted into the interior of the stator lamination packet SB defined by the inside circumference of the shell plate curve. After the removal of the shell plate curve, which is to be replaced by the support ring 4, the support ring can then be assembled.

If it is desired to dismantle individual support rings or all of the support rings, then the procedure can be performed in reverse, and one support ring after another can be replaced by corresponding shell plate curve segment assemblies. Once this has been done, then for removal of a particular slot segment bar group, the particular shell plate pieces that are located in an axial set and in the circumferential vicinity of this bar group to be removed can be dismantled. After re-assembly of the particular bar group, or assembly of a new bar group, the curved shell plate pieces of this axial set can be re-assembled once again. Then the successive replacement of a curved shell plate piece system can take place over its entire circumference by means of a support ring, in axial steps, until the entire inside circumference of the machine is again supported by the support rings.

We claim:

1. In a high-power dynamo-electric machine including:
   A) a stator lamination packet with an inner periphery defining a stator bore for a machine rotor revolving with an air gap at a given operating force, said stator lamination packet having:
      A1) a laminated screening packet with an inner periphery, a yoke region having an approximately circular-annular cross section, and lamination segments formed of magnetic material, and
      A2) a slot and tooth system disposed on the inner periphery of the screening packet, the slot and tooth system being formed of nonmagnetic material at least in the vicinity of the stator bore and having abutment points being distributed over the inner periphery of the screening packet and slot teeth, successive slot teeth tangentially defining circumferential interstices serving as axially parallel bar receiving slots with a slot bottom, the slot and tooth system being rigidly connected to the screening packet at the abutment points, and
   B) an air-gap winding on the inner periphery of the stator lamination packet having winding bars with winding bar sides oriented toward the stator bore, the winding bars being inserted in the circumferential interstices with a radial protrusion beyond the slot teeth into the air gap, a system for fixing the air-gap winding on the inner periphery of the stator lamination packet, the system comprising:
   a) a retaining device mounted from the stator bore, resting against the winding bar sides, pressing the winding bars against the slot bottom, and fixing the winding bars in position, said retaining device having a multiplicity of support rings being mutually aligned in axial direction of the dynamo-electric machine and having circumferences and outer peripheries, said support rings being formed of elastically deformable resilient material, being divided by dividing seams at least at one point along the circumferences thereof,
   b) a turnbuckle inside the stator bore in the vicinity of at least one of said dividing seams varying the diameter and adjusting azimuthal prestressing of said support rings for diameter enlargement in order to generate a radial prestressing force engaging the winding bars being greater than the given operating force, for diameter variations upon assembly and dismantling and for post-tensioning of said support rings,
   c) said turnbuckle comprising a turnbuckle plate disposed at said outer peripheries of said support rings, a tensionable locking wedge in said dividing seams having a rearward end portion, and an adjusting screws oriented in an axial insertion direction and disposed in said rearward end portion, as viewed in radial direction when installed, said adjusting screw having a shaft end protruding beyond said support ring and threadedly receiving in a threaded bore formed in said turnbuckle plate, said locking wedges of said turnbuckles of axially adjacent support rings being in mutual contact with axially aligned turnbuckles of axially aligned and assembled support rings disposed in mutual axial alignment.

2. System according to claim 1, wherein said dividing seams define lateral surface of said support rings facing one another at a distance, said lateral surfaces being at least partially tapered from radially inward to radially outward, and said tensionable locking wedge has counterpart lateral surfaces corresponding in shape to and being in engagement with said lateral surfaces of said support rings, whereby pressure exerted per unit of surface area between said lateral surfaces of said support rings and said counterpart lateral surfaces being increased upon displacement of said locking wedge in a given clamping direction.

3. System according to claim 2, wherein said lateral surfaces of said support rings have adjoining partial lengths, one of said partial lengths being tapered from radially inward to radially outward and the other of said partial lengths being widened from radially inward to radially outward forming arrowhead-like protrusions and arrow-tail-like recesses on two of said support rings being azimuthally aligned and facing one another in pairs.

4. System according to claim 2, wherein said turnbuckle is clamped by relative displacement of said counterpart lateral surfaces of said locking wedge with respect to said lateral surfaces of said support rings in radial direction.

5. System according to claim 3, wherein said lateral surfaces of said support rings and said counterpart lateral surfaces of said locking wedge are tapered in wedge-like fashion in an axial insertion and clamping direction of said locking wedge having a wedge angle producing self-locking.

6. System according to claim 1, wherein said adjusting screw is a stud bold having a threaded shaft supported in a threaded blind bore formed in said rearward end portion of said locking wedge, and said stud bolt has a free end adjoining said threaded shaft having a threaded polygon and having said protruding shaft end adjacent thereto, and said rearward end portion of an associated locking wedge having a recess formed therein in the vicinity of said free end of said adjusting screw providing accessibility to said threaded polygon.

7. System according to claim 1, wherein said adjusting screw is a stud bolt having a threaded shaft supported in a threaded blind bore formed in said rearward end portion of said locking wedge, and said stud bolt has a free end adjoining said threaded shaft having a threaded polygon and having said protruding shaft end adjacent thereto.

8. System according to claim 1, wherein said support rings are formed of fiber-reinforced synthetic resin.

9. System according to claim 1, wherein said slot teeth have tops, the stator lamination packet has abutments, and including pressure pieces being disposed on the top of the slot teeth and supporting the winding bars with prestressing, clamping screws disposed radially in the vicinity of the slot teeth and anchored in the abutments of the stator lamination packet for retaining said pressure pieces, said pressure pieces and said clamping screws having heads being radially outwardly recessed with respect to the outer peripheries of said support rings, and wedge strips having heads engaged by said pressure pieces for tangential prestressing of the winding bars, said wedge strips being inserted into the interstices between the slot teeth and a respective winding bar side.

10. System according to claim 9, wherein the stator bore has an inner periphery, and said support rings having openings formed therein in radial alignment with said heads of said clamping screws through which a clamping tool can engage said heads of said clamping screws from the inner periphery of the stator bore.

11. System according to claim 1, including spring elements inserted between the outer peripheries of said support rings and said winding bar sides.

12. System according to claim 11, wherein said spring elements are strip-like wave springs.

13. System according to claim 23, including pressure strips disposed under said wave springs toward said winding bar sides.

14. System according to claim 12, including spring guide beds with flat U-shaped cross sections disposed between said wave springs and said support rings, said U-shaped cross sections having U-shaped channels receiving said wave springs.

15. In an electric machine including:
A) a stator lamination packet having:
   A1) an inner periphery defining a stator bore,
   A2) a laminated screening packet with an inner periphery and lamination segments formed of magnetic material, and
   A3) a slot and tooth system disposed on and connected to the inner periphery of the screening packet, the slot and tooth system being at least partly formed of nonmagnetic material and having successive slot teeth defining bar receiving slots with a slot bottom, and
B) an air-gap winding on the inner periphery of the stator lamination packet having winding bars with winding bar sides oriented toward the stator bore, the winding bars being inserted in the bar receiving slots with a radial protrusion beyond the slot teeth, a system for fixing the air-gap winding on the inner periphery of the stator lamination packet, the system comprising:
   a) a retaining device pressing the winding bar sides against the slot bottom, said retaining device having an multiplicity of elastic support rings being mutually aligned in axial direction of the electric machine and having outer peripheries, said support rings having at least one dividing seam formed therein,
   b) a turnbuckle inside the stator bore in the vicinity of said at least one dividing seam for varying the diameter and adjusting azimuthal prestressing of said support rings,
   c) said turnbuckle comprising a turnbuckle plate disposed at said outer peripheries of said support rings, a tensionable locking wedge in said dividing seam having a rearward end portion, and an adjusting screw oriented in an axial insertion direction and disposed in said rearward end portion, as viewed in radial direction when installed, said adjusting screw having a shaft end protruding beyond said support ring and threadedly received in a threaded bore formed in said turnbuckle plate, said locking wedges of said turnbuckles of axially adjacent support rings being in mutual contact with axially aligned turnbuckles of axially aligned and assembled support rings disposed in mutual axial alignment.

* * * * *